United States Patent Office 3,345,361
Patented Oct. 3, 1967

3,345,361
CERTAIN N,N'-SUBSTITUTED DIAMINOETHANE COMPOUNDS
Gustav Ehrhart, Bad Soden, Taunus, Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Germany, a corporation of Germany
No Drawing. Filed Feb. 25, 1964, Ser. No. 347,109
Claims priority, application Germany, Mar. 1, 1963, F 39,147
3 Claims. (Cl. 260—239)

The present invention relates to N,N'-substituted diaminomethane compounds which show favourable physiological action particularly on the heart and the blood circulation. The compounds may be used as medicaments, for example for the treatment of angina pectoris, causing dilation of the coronary vessels. The invention also relates to processes for preparing the aforementioned compounds, and furthermore, provides pharmaceutical preparations containing N,N'-substituted diaminoethane compounds as active ingredients and exhibiting beneficial action on the heart and blood circulation.

We have found a process for the manufacture of N,N'-substituted diaminoethane compounds of the general Formula I

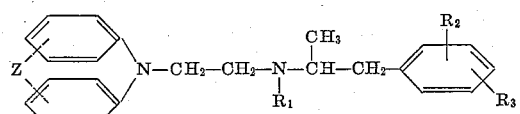

in which $R_1$ represents hydrogen or methyl, $R_2$ and $R_3$ may be equal or different, each representing hydrogen or methoxyl, and Z may represent a single bond, an oxygen, sulfur, ethylene or methylene bridging group, and of the addition salts of said compounds with physiologically tolerable acids, wherein (a) An amine of the general Formula II

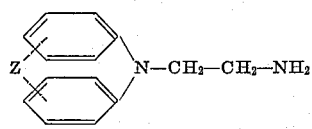

in which Z has the meaning given above, is condensed with a phenyl-acetone compound, which may carry one or two methoxy groups in the phenyl nucleus, and is simultaneously or subsequently hydrogenated, or wherein (b) An amine of the general Formula IIa

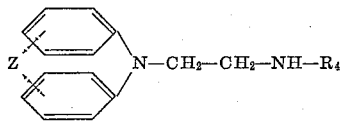

in which $R_4$ represents hydrogen, methyl or benzyl and Z has the meaning given above, preferably in the presence of an agent binding hydrogen halide, is condensed with a 1-phenyl-2-halogen-propane compounds or a 1-penyl-2-halogen-propene compound which may carry one or two methoxy groups in the phenyl nucleus, and where a compound containing a double bond is obtained, this is hydrogenated, or wherein (c) A halogenated diphenyl-aminoethane of the general Formula III

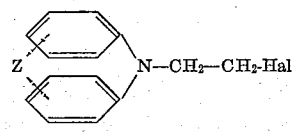

in which Hal represents chlorine, bromine, or iodine, and Z has the meaning given above, is reacted with a 2-amino-3-phenyl-propane compound, which may carry one or two methoxy groups in the phenyl nucleus, preferably in the presence of an agent binding hydrogen halide, or wherein (d) A diphenyl-amino compound, the phenyl moieties of which may be linked by a single bond, an oxygen, sulfur, ethylene or methylene bridging group, is condensed with a halogenated alkyl-amine of the general Formula IV

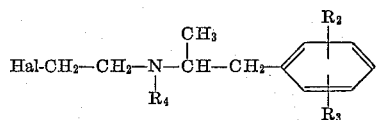

in which $R_2$ and $R_3$ have the meanings given above, Hal represents chlorine, bromine or iodine, and $R_4$ stands for hydrogen, methyl or benzyl, preferably in the presence of an agent binding hydrogen halide, or wherein (e) An aldehyde of the general Formula V

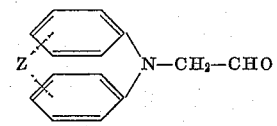

in which Z has the meaning given above, is condensed with a 2-amino-3-phenyl-propane compound, which may carry one or two methoxy groups in the phenyl nucleus, and is simultaneously or subsequently hydrogenated, or wherein (f) An acid amide of the general Formulae VI or VII

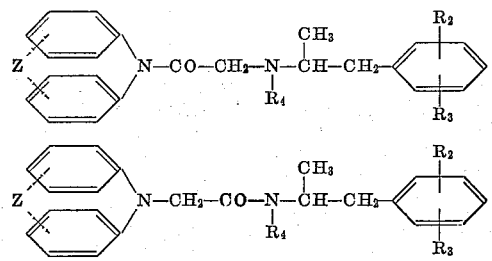

in which Z, $R_2$, $R_3$ and $R_4$ have the meanings given above, is reduced, and further, after having carried out the processes described in paragraphs (b), (c), (d), (f) the benzyl group, which may be present in the products, is removed by catalytic hydrogenation, and moreover, after having carried out the processes described in paragraphs (a)–(f), the amine thus obtained may be methylated, if desired, at the secondary nitrogen atom. The product thus obtained may be converted into the corresponding acid addition salt by the addition of a physiologically tolerable acid.

As starting substances for the process described in paragraph (a) the following compounds enter into consideration: 1-diphenyl-amino-2-aminoethane, 10(2'-aminoethyl)-phenothiazine, 10-(2'-aminoethyl)-phenoxazine, 9-(2'-aminoethyl)-carbazole, 2-aminoethyl-1-iminodibenzyl on the one hand and phenyl acetone, o, m, p-methoxyphenyl acetone compounds and dimethyl-phenyl-acetone compounds on the other. The aforementioned amines can be prepared for example, by reacting the aromatic nitrogen compounds such as phenothiazine with ethylene oxide, treating the alcohols formed with thionyl chloride and replacing the chlorine atom by the amino group.

The reduction of the condensation products prepared according to the method described in paragraph (a) is advantageously carried out by catalytic hydrogenation.

The metals of the eighth group of the Periodic Table (short form, in D. E. Kirk and D. F. Othmer, Encyclopaedia of Chemical Technology, vol. 5, page 672), preferably noble metals such as palladium and platinum, are suitable as catalysts. It is preferable to operate in the presence of solvents which are known ot be used for hydrogenation purposes, for example alcohols, even in a mixture with water. Nickel catalysts, advantageously Raney catalysts, may also be used. The reduction may otherwise be carried out by means of sodium boron hydride, in which case the condensation product is advantageously first prepared from the amine and phenyl acetone, if necessary with gentle heating and in the presence of an inert organic solvent, for example benzene or toluene. After dilution with a suitable solvent, for example a low molecular weight alcohol such as methanol or ethanol, the condensation product is reduced, if desired in the presence of water, by the portionwise addition of sodium boronhydride. The reduction may also be carried out by means of nascent hydrogen, for example from aluminium amalgam and alcohol, sodium amalgam, or lithium-aluminium hydride. The reduction may also be effected electrolytically.

As starting substances for the process described in paragraph (b), the following compounds enter into consideration: 1-phenyl-2-chloropropane, 1-phenyl-2-bromopropane, 1-phenyl-2-iodopropane, 1-phenyl-2-chloropropene,, 1-phenyl-2-bromopropene and 1-phenyl-2-iodopropene and the corresponding o, m, and p-methoxyphenyl compounds or dimethoxyphenyl compounds. The 1-phenyl-2-halogen-propanes may be obtained, for example, by halogenating methyl-benzyl carbinols (cf. Beilstein, "Handbuch der organischen Chemie," vol. 5, 391 and 5, I. Ergb, 190).

The reaction according to the process described in paragraph (b) is preferably carried out in suitable solvents with prolonged heating, for example, in aromatic hydrocarbons, such as benzene or toluene. It is preferable to react 1 mol of a possibly substituted 1-phenyl-2-halogen-propane or 1-phenyl-2-halogen-propene with 2 mols of the amine, the excess of the amine being present for binding the hydrogen halide set free during the reaction. The hydrogen halide may also be bound by the usual basic agents, for example alkali metal carbonates, alkaline earth metal carbonates, alkali metal hydroxides and alkaline earth metal hydroxides, or by organic bases, for example pyridine or quinoline which in turn may also be used as solvents. The reaction mixture is worked up by separating the hydrohalic acid salt of the base, for example, by precipitation with ether or shaking the water. The products of the process may be purified by distillation or by converting them into the appropriate salts. If propene halides are used, the double bond containing compound is hydrogenated by activated hydrogen according to known methods.

As starting substances for the process described in paragraph (c), the following compounds may be used: 1-diphenyl-amino - 2 - chloroethane, 1-diphenyl-amino-2-bromethane, 1-diphenyl-amino-2-iodethane, 1-[2'-chlorethyl] - phenothiazine, 1 - [2'-bromethyl]-phenothiazine, 1-[2'-iodethyl] - phenothiazine, 1-[2'-chlorethyl] - phenoxazine, 1-[2'-bromethyl]-phenoxazine, 1-['-iodethyl]-phenoxazine, 9-[2'-chlorethyl]-carbazole, 9-[2'-bromethyl] - carbazole, 9 - [2'-iodethyl]-carbazole, N-(2-chloroethyl-1-iminodibenzyl), N - (2-bromethyl-1-iminodibenzyl), N-(2-iodethyl-1-iminodibenzyl).

These halogenated diphenyl-aminoethane compounds can be prepared by reacting the aromatic nitrogen compounds for example phenothiazine with ethylene oxide and treating the alcohol formed with phosphorus halides.

For the process described in paragraph (d), the following compounds may be used as starting substances: diphenylamine, phenoxazine, phenothiazine, carbazole and iminodibenzyl on the one hand and 1-phenyl-2-(N-chloroethyl-N-methyl-amino)-propane, 1-methoxy-phenyl-2-(N-chlorethyl-N-methyl-amino)-propane, 1-dimethoxy-phenyl - 2 - (N-chlorethyl-N-methyl-amino)-propane and the corresponding bromine or iodine compounds on the other. The latter compounds may be prepared according to the methods described in U.S. Patents Nos. 2,597,247 and 2,557,248.

The condensation according to the method described in paragraph (d) is preferably carried out in inert organic solvents, for example benzene, toluene or xylene. As agents binding hydrogen halide, there may be mentioned for example, potassium hydroxide, sodium hydroxide, potassium carbonate, sodium carbonate, sodium amide, sodium phenyl, lithium phenyl and metallic sodium. Two out of the three reaction components used (an aromatic amine, a halogen binding agent and a halogenalkyl amine) are preferably dissolved or suspended in benzene, toluene or a similar solvent, and the third component is then added portionwise. The mixture is then boiled for some time under reflux, and after the addition of water, is worked up in the usual manner, for example by extracting the basic components from the organic solvent by means of dilute acids.

For the process described in paragraph (e), the following compounds may be used as starting substances: diphenyl-amino-acetaldehyde, 10 - phenothiazinyl-acetaldehyde, 10-phenoxazinyl-acetaldehyde, 9-carbazolyl-acetaldehyde, 1-iminodibenzyl-acetaldehyde. The conditions of this reaction are the same as those described in paragraph (a).

The acid amides of the general Formula VI used as starting substances in the process described in paragraph (f) can be prepared by reacting aromatic amines, for example diphenylamine, phenothiazine or carbazole with chloracetyl chloride by boiling them in benzene and treating the resulting chloracetic acid compounds with an excess of 2-amino-3-phenyl-propane or with the corresponding compounds which are methoxylated in the phenyl nucleus. The compounds of the general Formula VII can be prepared by reacting diphenyl-amino-acetic acid chloride with 2-amino-3-phenyl-propanes or with the corresponding compounds which are methoxylated in the phenyl nucleus.

The acid amides according to paragraph (f) are reduced preferably by means of lithium-aluminium hydride and in the presence of inert solvents, for example ether, dioxane or tetrahydrofuran. When employing this method of reduction, lithium-aluminium hydride is suspended in one of the aforementioned solvents, the carboxylic acid amide is added, and the reaction mixture is boiled for some time under reflux. The product obtained is decomposed with water and worked up in the usual manner by separating the organic from the inorganic components. The reduction of the carboxylic acid amides to the corresponding amines may also be carried out electrolytically.

The separation of the benzyl group at the nitrogen atom ($R_4$=benzyl) which may become necessary according to the processes of paragraphs (b), (c), (d) and (f) may be carried out in usual manner, for example by catalytic hydrogenation in the presence of a noble metal catalyst, for example palladium.

The methylation at the secondary nitrogen atom, which may be carried out according to the processes described in paragraphs (a) to (f) is performed preferably by catalytic hydrogenation in the presence of formaldehyde or by heating with formaldehyde and concentrated formic acid. Dimethyl sulfate or methyl halides can also be used as methylating agents.

The products of the invention can be converted into the corresponding salts by the addition of a physiologically tolerable inorganic or organic acid. As inorganic acids there may be mentioned hydrohalic acids, for example hydrochloric acid and hydrobromic acid, sulfuric acid, phosphoric acid and amidosulfonic acid. As organic acids, there may be mentioned, acetic acid, propionic acid, latic acid, glycollic acid, gluconic acid, maleic acid, succinic acid, tartaric acid, benzoic acid, salicylic acid, citric acid, aceturic acid, hydroxyethane sulfonic acid and ethylene-diamine-tetraacetic acid.

The compounds of the invention may be used as drugs. They have a beneficial efficiency on the heart and blood vascular circulation; particularly they cause dilatation of the coronary arteries, which can be demonstrated by pharmacological tests.

For example, upon application of 2.5 micrograms of N-[1-phenyl-propyl-(2')]-N-methyl-aminoethyl - (2) - diphenylamine hydrochloride by means of one injection into an isolated guinea pig heart according to the method of Langendorff, a strong dilatation of the coronary vessels was observed. In comparison to the untreated guinea pig heart, this dilatation corresponded to an increase of the coronary blood flow of about 35%. In contradistinction thereto, 5 micrograms of the known 1-phenyl-2[1',1'-diphenylpropyl-(3')]-aminopropane must be administered in order to exhibit the same dilatation of the coronary vessels. Upon intravenous administration to mice, the toxicity of the new products ($LD_{50}$) amounts to 50 mg./kg., i.e. 50% of the animals died when treated with this dose.

Furthermore, the blood perfusion in the Ramus circumflexus of the left coronary artery of a dog's heart in situ was examined, 4 dogs being treated in narcosis. Upon injection of 0.5 mg./kg. of N-[1'-phenyl-propyl-(2)]-N-methyl-aminoethyl-(2)-diphenylamine-hydrochloride prepared according to the present invention, the increase of the blood flow in this artery branch amounted to 68% on the average. Upon the injection of 1 mg./kg., the increase of the blood flow amounted to 90% on the average.

The compounds of the invention may be administered as bases or in the form of their addition salts with physiologically tolerable acids, if desired in admixture or conjunction with pharmaceutically suitable carriers, either parenterally or orally. For oral administartion the compounds may be used in the form of tablets or dragées which contain, in addition to the compounds of the invention, the usual carriers, for example, lactose, starch, tragacanth and magnesium stearate. 5–50 mg. of the compound may be administered as a single dose. The following examples serve to illustrate the invention, but they are not intended to limit it thereto:

EXAMPLE 1

*N-[1-phenyl-propyl-(2)]-N-methyl-aminoethyl-(2')-diphenylamine*

16.9 grams of diphenyl amine are dissolved in 200 cc. of benzene. 21.2 grams of 1-phenyl-2-(N-chlorethyl-N-methyl-amino)-propane and 4.5 grams of sodium amide are added. The mixture is boiled for 5 hours under reflux. The benzene solution is washed with water, the benzene is evaporated and the residue is distilled in vacuo. The N-[1-phenyl-propyl-(2)]-N-methyl - aminoethyl - diphenylamine boiling at 195 to 198° C. under a pressure of 0.05 cc., forms a thick, colourless oil. The yield is 31 grams. For the preparation of the hydrochloride 17.2 grams of the base are dissolved in 50 cc. of methanol and 50 cc. of hydrochloric acid and concentrated to dryness in vacuo. The residue is dissolved in a little hot alcohol, ether is added until the solution becomes turbid. On cooling, 15.1 grams of hydrochloride crystallize out in the form of colorless crystals, melting at 144–145° C.

EXAMPLE 2

*N-[1-phenyl-propyl-(2)]-aminoethyl-diphenylamine*

(a) 24.5 grams of chloracetyl-diphenylamine are boiled under reflux for 4 hours with 27 grams of 1-phenyl-2-aminopropane in 150 cc. of benzene. The benzene is distilled off under reduced pressure and the residue is dissolved in ether. The ethereal solution is filtered off from the undissolved 1-phenyl-2-aminopropane-hydrochloride, extracted by means of 50 cc. of 2 N-hydrochloric acid. N-[1-phenyl-propyl-(2)]-amino-acetic acid diphenylamide hydrochloride crystallizes. After recrystallization from three times the quantity of alcohol, 31.5 grams of pure white crystals are obtained. Melting point 220–221° C.

(b) 11 grams of N-[1-phenyl-propyl-(2)] amino-acetic acid-diphenylamide are dissolved in 70 cc. of absolute ether. 1 gram of lithium aluminium hydride is slowly introduced. The mixture is then boiled for 6 hours under reflux. The reaction solution is subsequently decomposed by dropwise adding dilute alcohol, the ether solution is decanted from the aluminium slime, washed with water, dried by means of potassium carbonate and concentrated. The remaining nearly colourless oil is dissolved in the same quantity of methanol and neutralized with the calculated quantity of 1 N-hydrochloric acid. Crystallization sets in on cooling. After recrystallization from alcohol/ester, 8 grams of N - [1 - phenyl - propyl - (2)] - aminoethyl-diphenylamine hydrochloride are obtained as white crystals. Melting point 182–183° C.

EXAMPLE 3

*N-[1-m-methoxy-phenyl-propyl-(2)]-N-methyl-aminoethyl-diphenylamine*

9.2 grams of diphenylamine are dissolved in 100 cc. of benzene, 13 grams of 1-m-methoxyphenyl-2-(N-chlorethyl-N-methylamino)-propane and 2.7 grams of sodium amide are added. The mixture is boiled for 6 hours under reflux. The benzene is then evaporated in vacuo, the residue is dissolved in ether, the ether solution is washed with water and shaken with dilute hydrochloric acid. An oily hydrochloride precipitates as third layer. It is separated. A potassium carbonate solution is added and the precipitated base is taken up in ether. After evaporation of the ether, 16.5 grams of N-1-m-methoxyphenyl-propyl-1-(2)]-N-methyl-aminoethyl-diphenylamine is obtained in the form a light-brown oil. This product is dissolved in a little alcohol with the equivalent quantity of maleic acid, ether is added until the solution becomes turbid. The maleate is obtained in the form of colourless crystals melting at 116–117° C. When using hydrochloric acid the hydrochloride is obtained in the corresponding manner: Melting point 127–128° C.

EXAMPLE 4

*N-[1-(3,4-dimethoxy-phenyl)-propyl-(2)] - N - methyl - aminoethyl-diphenylamine*

6.9 grams of diphenyl amine and 11 grams of 1-(3,4-dimethoxy-phenyl)-2-(N-chloroethyl-N-methyl - amino) - propane (prepared from 3,4-dimethoxy-phenyl-acetone with aminoethanol, hydrogenation of the Schiff base, methylation with formic acid and formaldehyde and reaction of the basic alcohol obtained with thionyl chloride) are dissolved in 150 cc. of benzene. 2 grams of sodium amide are added, and the solution is boiled under reflux for 6 hours. Subsequently, the benzene is distilled off under reduced pressure, the residue is taken up in ether, the ether solution is washed with water and shaken with a small excess of 2 N-hydrochloric acid whereby the hydrochloride of the reaction product which is only sparingly soluble in water separates at the bottom in the form of a light-brown oil. In order to purify the reaction product the oily hydrochloride is isolated, the base is separated by the addition of a potassium carbonate solution and extracted with ether. The ether solution is then dried by means of potassium carbonate and mixed with the equivalent quantity of oxalic acid in ether, whereby crystallization takes place. By dissolving the reaction product in 12 times the quantity of hot alcohol and allowing it to crystallize there are obtained 15.5 grams of N-[1-(3,4-dimethoxy-phenyl) - propyl - (2)] - N - methyl - aminoethyl-diphenylamine oxalate melting at 171–172° C.

EXAMPLE 5

N-[1-phenyl-propyl-(2)]-N-methyl-aminoethyl-carbazole 16.7 grams of carbazole, 21.1 grams of 1-phenyl-2-[N-chloroethyl-N-methylamino]-propane, 250 cc. of benzene and 5 grams of sodium amide are boiled under reflux. The benzene solution obtained is mixed with ether, washed several times with water, shaken with a small excess of 2 N-hydrochloric acid, whereby the hydrochloride which is sparingly soluble in water precipitates first in the form of an oil and then crystallizes after some hours. After recrystallization from alcohol/ether, 18 grams of N-[4 - phenyl - propyl - (2)]-N-methyl-aminoethyl-carbazole-hydrochloride are obtained in the form of colourless crystals. Melting point 184–185° C.

EXAMPLE 6

N-[1-phenyl-propyl-(2)]-N-methyl-aminoethyl-phenthiazine 19.8 grams of phenthiazine, 100 cc. of toluene and 5 grams of sodium amide are boiled under reflux for 1 hour on the oil bath. After cooling, 21 grams of 1-phenyl-2-(N-chloroethyl-N-methyl-amino)-propane are added and the mixture is heated for a further 3 hours under reflux. After cooling, the reaction mixture is acidified with 2 N-hydrochloric acid. A thick, dark green oil separates which is sparingly soluble in water. Said oil is shaken with dilute sodium hydroxide solution and ether, the mixture is dried by means of potassium carbonate, and the ether is removed. A thick dark-green oil remains which is stirred with the equivalent quantity of phosphoric acid of 50% strength. After standing for a longer period the mass crystallizes. After filtering with suction and washing with water and ether, the reaction product is dissolved in 10 times the quantity of methanol, treated with decolorising carbon and the filtrate is concentrated to dryness at room temperature under reduced pressure. After washing the residue with ether, 27.5 grams of N-[1 - phenyl - propyl - (2)]-N-methyl - aminoethyl-phenthiazine-phosphate are obtained in the form of a grey-green powder. Melting point 106–110° C.

EXAMPLE 7

N-[1-phenyl-propyl-(2)]-N-methyl-aminoethyl-o-iminodibenzyl 9.3 grams of iminodibenzyl, 100 cc. of benzene, 10.1 grams of 1 - phenyl - 2 - (N - chloroethyl - N - methylamino)-propane and 2.2 grams of sodium amide are boiled under reflux for 3 hours. The benzene solution is then washed with water, treated with decolorizing carbon and shaken with 50 cc. of N-hydrochloric acid. 14.5 grams of N-[1-phenyl-propyl-(2)]-N-methyl-aminoethyl-iminodibenzyl-hydrochloride crystallize. After recrystallization from 20 times the quantity of alcohol of 66% strength the product obtained melts at 247–248° C. The free base boils at 205–208° C. under a pressure of 0.02 mm. and is a transparent thick oil.

EXAMPLE 8

N-[1-phenyl-propyl-(2)]-aminoethyl-o-iminodibenzyl 15 grams of iminodibenzyl, 100 cc. of benzene, 22 grams of 1 - phenyl - 2 - (N - chlorethyl - N - benzylamino)-propane and 3.5 grams of sodium amide are mixed and boiled under reflux for 3 hours. The so obtained benzene solution is washed with water and shaken with a small excess of dilute hydrochloric acid, whereby the N - [1 - phenyl - propyl - (2)] - N - benzyl - aminoethyl-iminodibenzyl-hydrochloride precipitates as third layer. It is separated, dissolved in methanol and hydrogenated at 40–50° C. by means of a palladium catalyst and hydrogen. After filtering off the catalyst and removing the methanol, N-[1-phenyl-propyl-(2)]-aminoethyl-iminodibenzyl is separated as oil from the residue after the addition of dilute sodium hydroxide solution. The reaction product is then distilled under reduced pressure. It boils at 215–220° C. under a pressure of 0.05 mm. The hydrochloride melts at 248° C., the aminosulfonate melts at 159–160° C.

EXAMPLE 9

N-[1-phenyl-propyl-(2)]-aminoethyl-iminodibenzyl 16.7 grams of iminodibenzyl are dissolved in 100 cc. of benzene, 16.9 grams of 1-phenyl-2-(chloroethylamino)-propane (prepared from 1 - phenyl - 2 - aminopropane and ethylene-chlorohydrine by heating for 4 hours to 140° C. and reacting the basic alcohol obtained with thionyl chloride) and 4.2 grams of sodium amide are boiled under reflux for 5 hours. The benzene solution is then washed with water and shaken with dilute hydrochloric acid. N-[1 - phenyl - propyl - (2)]-aminoethyl-iminodibenzyl-hydrochloride separates first in the form of an oil and becomes crystalline later on. By recrystallization from 100 times the quantity of hot water, a product melting at 247–248° C. is obtained, which is the same as that obtained according to Example 8.

EXAMPLE 10

N-(1-phenyl-propyl-2)-aminoethyl-diphenyl-amine 21 grams of diphenyl-ethyl-amine (boiling point 135–137° C. under a pressure of 0.3 mm. of mercury, prepared by reacting diphenyl amine with paraformaldehyde and potassium cyanide in glacial acetic acid and reducing the so obtained diphenyl-amino-acetonitrile with hydrogen in the presence of Raney nickel in methanol) 15 grams of phenyl acetone and 400 milliliters of methanol are hydrogenated in the presence of palladium-black at 100 atmospheres excess pressure of hydrogen and at 80–90° C. The absorption of hydrogen being terminated, the reaction mixture is allowed to cool and the catalyst is filtered off with suction. The solvent is evaporated and the residue is distilled. The oily product boils at 215° C. under a pressure of 0.4–0.5 mm. The so obtained oil is dissolved in the same quantity of methanol and neutralized with the equivalent quantity of 1 N-hydrochloric acid. After working up the crystalline product according to the method described in Example 2(b), N-(1-phenylpropyl-2)-aminoethyl - diphenyl - amine hydrochloride is obtained in a good yield. Melting point 182–183° C.

We claim:
1. Iminodibenzyl compounds of the formula

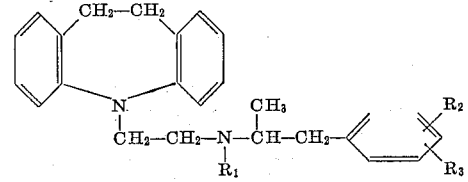

in which $R_1$ is hydrogen or methyl, $R_2$ and $R_3$ are identical or different and represent hydrogen or methoxy and acid addition salts of said compounds with physiologically tolerable acids.

2. N-[1-phenyl-propyl-(2)]-N-methyl - aminoethyl - o-iminodibenzyl.

3. N-[1-phenyl-propyl-(2)]-aminoethyl - o - iminodibenzyl.

References Cited

FOREIGN PATENTS 1,051,858  3/1959  Germany.
1,087,605  8/1960  Germany.

ALTON D. ROLLINS, Primary Examiner.